United States Patent
Kim et al.

(10) Patent No.: US 8,397,521 B2
(45) Date of Patent: Mar. 19, 2013

(54) SUPERCOOLING RECOGNITION METHOD AND SUPERCOOLING APPARATUS

(75) Inventors: Su-Cheong Kim, Changwon-si (KR);
Jong-Min Shin, Busan (KR);
Deok-Hyun Youn, Gimhae-si (KR);
Jae-Hyun Soh, Paju-si (KR);
Cheol-Hwan Kim, Changwon-si (KR);
Won-Young Chung, Changwon-si (KR);
Hoon-Bong Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 393 days.

(21) Appl. No.: 12/677,329

(22) PCT Filed: Sep. 22, 2008

(86) PCT No.: PCT/KR2008/005619
§ 371 (c)(1),
(2), (4) Date: Apr. 6, 2010

(87) PCT Pub. No.: WO2009/038426
PCT Pub. Date: Mar. 26, 2009

(65) Prior Publication Data
US 2010/0319368 A1 Dec. 23, 2010

(30) Foreign Application Priority Data
Sep. 21, 2007 (KR) .................. 10-2007-0096900

(51) Int. Cl.
*F25C 1/00* (2006.01)
(52) U.S. Cl. .................. 62/66; 62/75; 62/129
(58) Field of Classification Search ................ 62/75, 89, 62/161, 349, 129, 126, 66; 426/237; 99/473; 165/59, 902; 700/300
See application file for complete search history.

(56) References Cited

U.S. PATENT DOCUMENTS

| | | | | |
|---|---|---|---|---|
| 4,689,615 A | * | 8/1987 | Del Rosso | 345/440.2 |
| 5,560,213 A | * | 10/1996 | Wieszt | 62/125 |
| 6,133,558 A | * | 10/2000 | Ueda et al. | 219/682 |
| 2001/0035018 A1 | * | 11/2001 | Takagi et al. | 62/228.4 |
| 2002/0017103 A1 | * | 2/2002 | Hiraoka et al. | 62/127 |
| 2002/0177119 A1 | * | 11/2002 | Wisniewski | 435/2 |
| 2003/0066295 A1 | * | 4/2003 | Wisniewski et al. | 62/66 |
| 2004/0028786 A1 | * | 2/2004 | Tani et al. | 426/524 |
| 2004/0053204 A1 | | 3/2004 | Morris et al. | |
| 2005/0005611 A1 | * | 1/2005 | Owada | 62/3.1 |
| 2005/0136161 A1 | * | 6/2005 | Okita | 426/393 |

FOREIGN PATENT DOCUMENTS

| | | |
|---|---|---|
| JP | 2003-88348 A | 3/2003 |
| WO | WO-2007/094549 A1 | 8/2007 |

* cited by examiner

*Primary Examiner* — Mohammad Ali
(74) *Attorney, Agent, or Firm* — Birch, Stewart, Kolasch & Birch, LLP

(57) ABSTRACT

The present invention relates to a supercooling recognition method and a supercooling apparatus which can rapidly and precisely judge whether a stored object is maintained in a supercooled state on the basis of a temperature thereof. A supercooling recognition method according to the present invention includes the steps of: cooling a stored object to below a temperature of a maximum ice crystal formation zone thereof; and judging whether the stored object is maintained in a supercooled state on the basis of a temperature thereof during the cooling step.

17 Claims, 2 Drawing Sheets

SUPERCOOLING RECOGNITION METHOD AND SUPERCOOLING APPARATUS

TECHNICAL FIELD

The present invention relates to a supercooling recognition method and a supercooling apparatus, and more particularly, to a supercooling recognition method and a supercooling apparatus which can rapidly and precisely judge whether a stored object is maintained in a supercooled state on the basis of a temperature thereof.

BACKGROUND ART

A term "supercooling" describes a phenomenon that melt or solid does not change even after it is cooled down to a temperature lower than the phase transition temperature at equilibrium state. In general, every material has its own stable state at a given temperature, so if temperature changes gradually, atoms of the substance keep abreast with the changes of temperature while maintaining its stable state at each temperature. However, if temperature changes abruptly, there is not enough time for the atoms to get into a stable state corresponding to each temperature. What happens then is the atoms either keep the stable state at a start temperature, or partially change to a state at a predetermined end temperature then stop.

For example, when water is cooled slowly, it does not freeze for some time even though the temperature is below 0° C. However, when an object becomes a supercooled state, it is a sort of metastable state where the unstable equilibrium state breaks easily even by a very small stimulus or minor external disturbance, so the object easily transits to a more stable state. That is to say, if a small piece of the material is put into a supercooled liquid, or if the liquid is subject to impact on a sudden, it starts being solidified immediately and temperature of the liquid is raised to a freezing point, maintaining a stable equilibrium state at the temperature.

Generally, foods such as vegetables, fruits, meats and beverages are refrigerated or frozen to be kept fresh. Such foods contain liquid elements such as water. If the liquid elements of the food are cooled below a phase transition temperature, the liquid elements are transited into solid elements at a predetermined time point. When the liquid elements are transited into the solid elements and the entire food is subsequently frozen, quality of the food is seriously lowered.

DISCLOSURE OF INVENTION

Technical Problem

The present invention has been made to solve the aforementioned shortcomings occurring in the prior art. An object of the present invention is to provide a supercooling recognition method and a supercooling apparatus which can rapidly judge whether a stored object is maintained in a supercooled state on the basis of a temperature thereof.

Another object of the present invention is to provide a supercooling recognition method and a supercooling apparatus which can precisely judge whether a stored object is maintained in a supercooled state, even when the stored object is maintained around a phase transition temperature.

A further object of the present invention is to provide a supercooling recognition method and a supercooling apparatus which can rapidly thaw a stored object, when the stored object is not maintained in a supercooled state.

Technical Solution

In order to achieve the above-described objects of the invention, there is provided a supercooling recognition method, including the steps of: cooling a stored object to below a temperature of a maximum ice crystal formation zone thereof; and judging whether the stored object is maintained in a supercooled state on the basis of a temperature thereof during the cooling step.

In addition, preferably, in the judgment step, after the temperature of the stored object reaches a phase transition temperature thereof, when the temperature of the stored object is maintained higher than the temperature of the maximum ice crystal formation zone thereof for a first reference time, it is judged that the stored object fails to maintain the supercooled state.

Moreover, preferably, in the judgment step, after the temperature of the stored object reaches the phase transition temperature thereof, when the temperature of the stored object is maintained around the phase transition temperature thereof for a second reference time, it is judged that the stored object fails to maintain the supercooled state.

Further, preferably, the supercooling recognition method includes a step of visually or audibly displaying a judgment result of the judgment step, when the stored object is not in the supercooled state in the judgment step.

Furthermore, preferably, the first or second reference time is set up according to one or more of a kind, volume and mass of the stored object.

Still furthermore, preferably, the supercooling recognition method includes a step of thawing the stored object, when the stored object is not in the supercooled state in the judgment step.

Still furthermore, preferably, the supercooling recognition method includes a step of checking one or more of the kind, volume and mass of the stored object.

There is also provided a supercooling apparatus, including: a cooling means for cooling a stored object to below a temperature of a maximum ice crystal formation zone thereof; a sensing means for sensing a temperature of the stored object; and a control means for acquiring the temperature of the stored object from the sensing means, controlling the cooling means to cool the stored object, and judging whether the stored object is maintained in a supercooled state on the basis of the temperature thereof.

In addition, preferably, after the temperature of the stored object reaches a phase transition temperature thereof, when the temperature of the stored object is maintained higher than the temperature of the maximum ice crystal formation zone thereof for a predetermined time, the control means judges that the stored object fails to maintain the supercooled state.

Moreover, preferably, the supercooling apparatus includes a thawing means for releasing the stored object from freezing, when the stored object fails to maintain the supercooled state.

Advantageous Effects

The supercooling recognition method and the supercooling apparatus in accordance with the present invention can rapidly judge whether the stored object is maintained in the supercooled state on the basis of the temperature thereof.

In addition, the supercooling recognition method and the supercooling apparatus in accordance with the present invention can precisely judge whether the stored object is maintained in the supercooled state, even when the stored object is maintained around the phase transition temperature.

Moreover, the supercooling recognition method and the supercooling apparatus in accordance with the present invention can rapidly thaw the stored object to minimize degradation, when the stored object is not maintained in the supercooled state.

MODE FOR THE INVENTION

Hereinafter, the present invention will be described in detail with reference to the preferred embodiments and accompanying drawings thereof.

Figure 1:
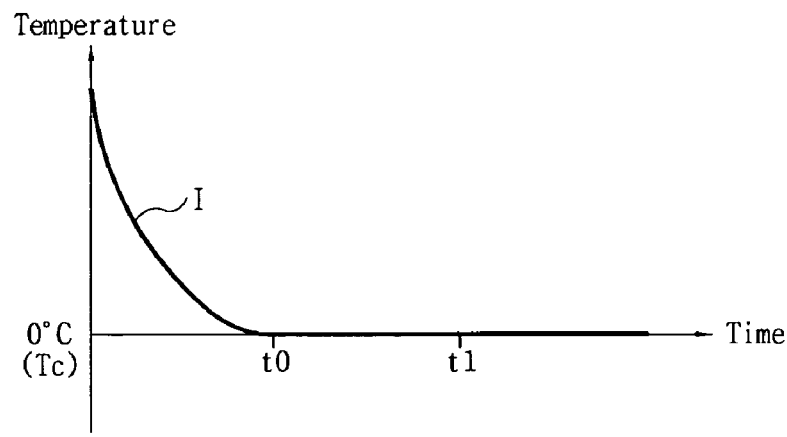
FIG. 1 is a graph showing a temperature in a state where a stored object fails to maintain a supercooled state according to a first embodiment of the present invention.

FIG. 1 is a graph showing a temperature in a state where a stored object fails to maintain a supercooled state according to a first embodiment of the present invention. In the first embodiment of FIG. 1, while the stored object is cooled, when a temperature I of the stored object reaches a phase transition temperature Tc thereof, e.g., when a temperature of water reaches 0° C., the stored object is phase-transited and frozen.

In the cooling processes of FIGS. 2 and 3 as well as the cooling process of FIG. 1, in a cooling space of receiving a stored object, e.g., water is cooled to below a temperature (−1 to −5° C.) of a maximum ice crystal formation zone that generates a maximum amount of ice crystals. That is, the stored object is cooled to a cooling temperature below a temperature of a maximum ice crystal formation zone thereof, so that the stored object can enter a supercooled state below a phase transition temperature thereof.

As illustrated in FIG. 1, while the cooling space of receiving the stored object is cooled, the temperature I of the stored object falls and reaches the phase transition temperature Tc thereof at a time point t0. Thereafter, the temperature I of the stored object continuously maintains the phase transition temperature Tc. When the stored object is maintained at the phase transition temperature Tc, the stored object is being phase-transited. That is, in the case of FIG. 1, it should be judged that the stored object does not enter the supercooled state, i.e., that the stored object is not maintained in the supercooled state at a time point t1 after a predetermined time t1−t0. The pre-determined time t1−t0 can be variably set up according to a kind, mass and volume of the stored object.

When the state of FIG. 1 continues, the stored object is cooled from the surface thereof, and finally phase-transited as a whole.

Figure 2:
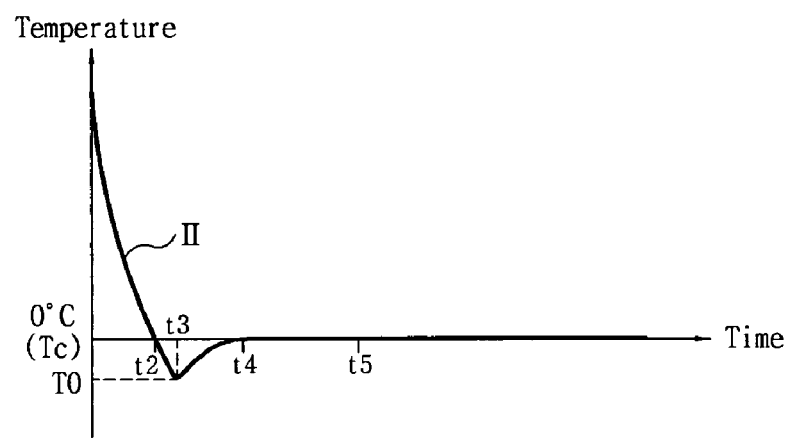
FIG. 2 is a graph showing a temperature in a state where a stored object fails to maintain a supercooled state according to a second embodiment of the present invention.

FIG. 2 is a graph showing a temperature in a state where a stored object fails to maintain a supercooled state according to a second embodiment of the present invention. In the second embodiment of FIG. 2, the stored object is cooled to below a phase transition temperature Tc. Here, the stored object is temporarily cooled to a region lower than the phase transition temperature Tc and higher than a temperature of a maximum ice crystal formation zone thereof. As a temperature H of the stored object rises to the phase transition temperature Tc, the stored object is phase-transited.

In the case of FIG. 2, after a sensor for sensing the temperature H of the stored object senses that the temperature II of the stored object reaches the phase transition temperature Tc, since the temperature T0 is slightly different from the phase transition temperature Tc, the sensor may not be able to sense the temperature T0. In addition, once the temperature II of the stored object becomes lower than the phase transition temperature Tc, it is difficult to judge whether the stored object is maintained in a supercooled state in the same way as that of the graph of FIG. 1.

Therefore, after the temperature II of the stored object reaches the phase transition temperature Tc, i.e., after a time point t2, the temperature II of the stored object exists in a temperature region T0 higher than a temperature of a maximum ice crystal formation zone. In a case where the temperature II of the stored object still exists in the region (lower than the phase transition temperature Tc and higher than the temperature of the maximum ice crystal formation zone) after a predetermined time t4−t2, it should be judged that the stored object is not maintained in the supercooled state but released from the supercooled state and phase-transited.

For example, at a time point of t5, the stored object maintained in the supercooled state is released from the supercooled state, so that a succeeding procedure (e.g., a thawing process) is carried out thereon.

Figure 3:
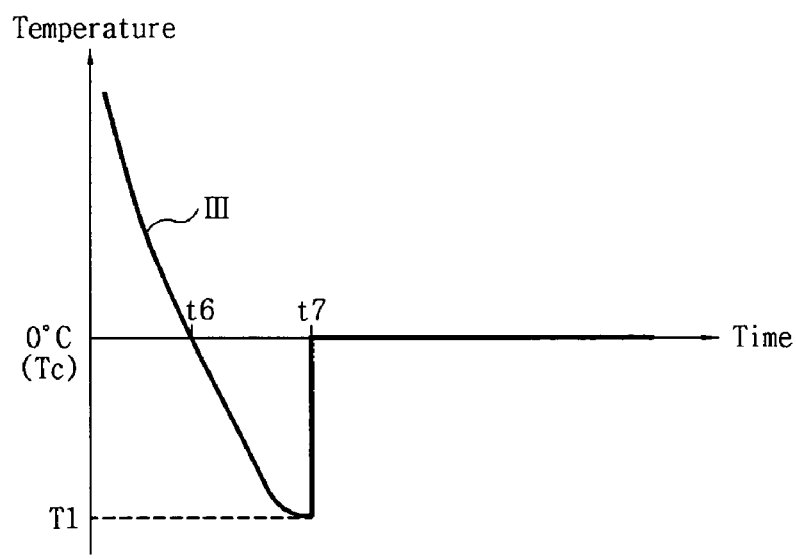
FIG. 3 is a graph showing a temperature in a state where a stored object fails to maintain a supercooled state according to a third embodiment of the present invention.

FIG. 3 is a graph showing a temperature in a state where a stored object fails to maintain a supercooled state according to a third embodiment of the present invention. In the third embodiment of FIG. 3, the stored object is maintained in a supercooled state below a temperature of a maximum ice crystal formation zone thereof, and phase-transited.

Referring to FIG. 3, after the stored object starts to be cooled, a temperature III of the stored object reaches a phase transition temperature Tc at a time point t6. Thereafter, the temperature III of the stored object continuously falls to a temperature T1 and sharply rises to around the phase transition temperature Tc, so that the stored object is phase-transited.

In FIG. 3, the temperature III of the stored object sharply changes, i.e., falls to the temperature T1 below the temperature of the maximum ice crystal formation zone, and rises to around the phase transition temperature Tc (a region lower than the phase transition temperature Tc and higher than the temperature of the maximum ice crystal formation zone). Accordingly, a sensor can recognize the temperature. In this case, after the temperature III of the stored object reaches the phase transition temperature Tc, the temperature change of the stored object is checked to judge that the stored object is maintained in a supercooled state, released from the supercooled state, and frozen.

Figure 4:
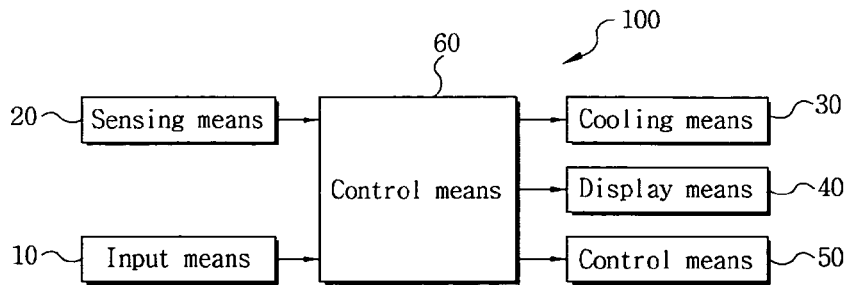
FIG. 4 is a configuration view illustrating a supercooling apparatus for performing a supercooling recognition method according to the present invention.

FIG. 4 is a configuration view illustrating a supercooling apparatus for performing a supercooling recognition method according to the present invention. A supercooling apparatus 100 includes an input means 10, a sensing means 20, a cooling means 30, a display means 40, a thawing means 50 and a control means 60.

The input means 10 allows a user to set up driving for general freezing and refrigerating control, set up a temperature, select a service type (flake ice, water, etc.) of a dispenser, and select a cooling mode of a storage space or a stored object and a cooling mode (or supercooling mode) according to the present invention. The input means 10 can be implemented with a keypad, touch screen, etc. In addition, the user can input through the input means 10 information on the stored object, such as a kind of the stored object, a phase transition temperature of the stored object, a temperature (i.e., temperature range) of a maximum ice crystal formation zone of the stored object, a mass of the stored object and a volume of the stored object. The input means 10 can be a barcode reader or an RFID reader to supply read information on the stored object to the control means 60.

The sensing means 20 senses the information on the stored object such as the volume or mass and temperature of the stored object and a temperature of the cooling space of receiving the stored object, and transfers the information to the control means 60. For example, the sensing means 20 can be a thermometer for sensing the temperature of the cooling space or the stored object, or a hardness meter, scale, optical sensor (or laser sensor) or pressure sensor for checking whether the stored object is stored in the storage space or released from the supercooled state, or for checking the kind, volume and mass of the stored object.

The cooling means 30 is a device for cooling the stored object received in the cooling space. The cooling means 30 can perform direct cooling or indirect cooling according to a cooling method. Detailed explanations thereof are omitted.

The cooling means 30 can start, maintain or stop the cooling under the control of the control means 60. Moreover, the cooling means 30 performs the cooling according to a temperature set up by the control means 60.

The display means 40 displays freezing and refrigerating temperatures of the cooling apparatus, the service type of the dispenser, a proceeding degree of a current cooling step, a time elapsing from the current cooling step, an operation inputted by the user, a temperature of a current stored object, etc. Specifically, the display means 40 can be implemented with an LCD display. In addition, the display means 40 can display information on whether the stored object is currently maintained in the supercooled state, and information on that a thawing process is performed on the stored object released from the supercooled state.

In a case where the stored object is not maintained in the supercooled state and is being frozen, such freezing has a serious detrimental effect on quality of the stored object. The thawing means 50 applies thermal energy or the like to the stored object so as to rapidly release the stored object from freezing. For example, the thawing means 50 can be a heat generation coil operated by applied power to generate heat.

The control means 60 receives the information on the stored object such as the kind, mass and volume of the stored object, or a required operation state such as a user's input for the supercooling mode through the input means 10 and the sensing means 20, and judges whether the cooling step is needed, the supercooled state is released, and the thawing process is needed. According to the judgment, the control means 60 controls the cooling means 30, the display means 40 and the thawing means 50 to perform the necessary operations. The control means 60 is provided with a built-in timer to judge the passage of a predetermined time. Further, the control means 60 can include a storage unit (not shown) for storing the information transferred through the input means 10 and the sensing means 20, thereby storing data such as a cooling speed according to the information on the object. The storage unit stores information on a temperature of a maximum ice crystal formation zone of each stored object, and data including a fixed thawing time for thawing the stored object or a thawing time based on the information of the stored object. Hereinafter, the control process of the control means 60 will be described in detail.

Figure 5:
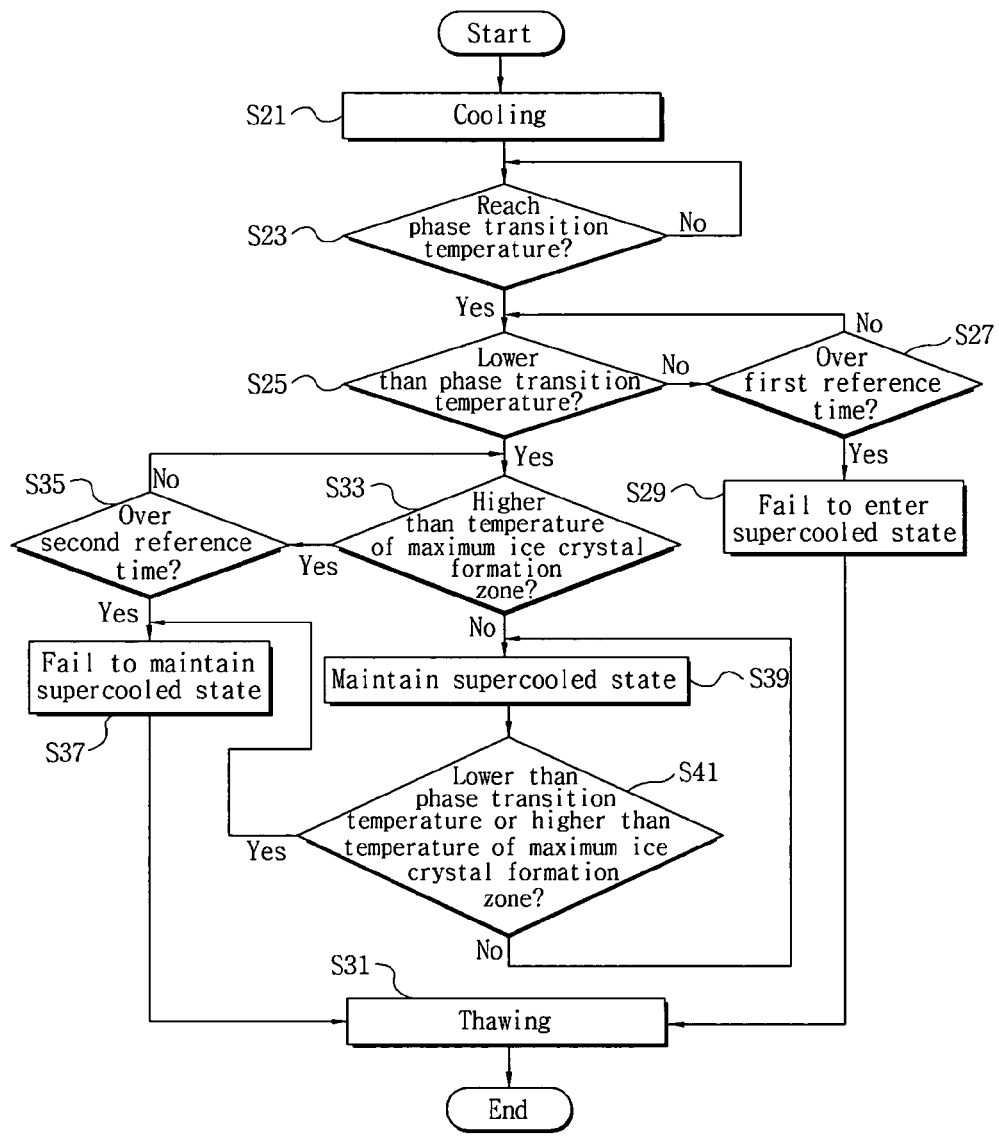
FIG. 5 is a flowchart showing the supercooling recognition method according to the present invention.

FIG. 5 is a flowchart showing the supercooling recognition method according to the present invention.

At step S21, the control means 60 operates the cooling means 30 to cool a stored object received in the cooling space. Here, the control means 60 cools the stored object at a cooling temperature below a temperature of a maximum ice crystal formation zone thereof. In addition, the control means 60 can check the information such as a kind, mass and volume of the stored object through the input means 10 or the sensing means 20, and set up the cooling temperature according to the checking result, or to check the temperature of the maximum ice crystal formation zone of the stored object.

At step S23, the control means 60 acquires a temperature of the stored object from the sensing means 20, and judges whether the temperature of the stored object reaches a phase transition temperature thereof. If the temperature of the stored object reaches the phase transition temperature thereof, the control means 60 goes to step S25. If the temperature of the stored object does not reach the phase transition temperature thereof, the control means 60 maintains a standby state. Even though the routine proceeds to step S25, the control means 60 controls the cooling means 30 to continuously cool the stored object.

At step S25, the control means 60 judges whether the temperature of the stored object is lower than the phase transition temperature according to the temperature from the sensing means 20. If the temperature of the stored object constantly maintains the phase transition temperature, the control means 60 goes to step S27, and if the temperature of the stored object is lower than the phase transition temperature, the control means 60 goes to step S33.

At step S27, the control means 60 judges whether a first reference time elapses by means of the built-in timer. If the first reference time elapses, the control means 60 proceeds to step S29, and if not, the control means 60 proceeds to step S25. That is, the control means 60 checks whether the temperature of the stored object maintains the phase transition temperature over the first reference time. This step is to judge whether the stored object is maintained in the supercooled state in the case of FIG. 1.

At step S29, the control means 60 judges that the stored object does not enter the supercooled state, and displays through the display means 40 that the stored object fails to maintain the supercooled state. That is, the control means 60 judges that the stored object is phase-transited directly after reaching the phase transition temperature.

At step S31, the control means 60 stops the cooling of the cooling means 30, or operates the thawing means 50 to perform a thawing process for releasing the stored object from freezing. The control means 60 can selectively or cooperatively stop the cooling of the cooling means 30 and start the thawing of the thawing means 50. The more the stored object is frozen, the worse quality the stored object has. Therefore, the thawing process should be performed as early as possible.

At step S33, the control means 60 judges whether the temperature of the stored object is higher than the temperature of the maximum ice crystal formation zone thereof. This step is to judge whether the stored object is maintained in the supercooled state in the case of FIG. 2. If the temperature of the stored object is higher than the temperature of the maximum ice crystal formation zone thereof, the control means 60 goes to step S35, and if not, the control means 60 goes to step S39.

At step S35, the control means 60 judges whether the stored object is maintained at the phase transition temperature over a second reference time. If the second reference time elapses, the control means 60 proceeds to step S37, and if not, the control means 60 proceeds to step S33.

At step S37, the control means 60 judges that the stored object is phase-transited and frozen in a temperature region lower than the phase transition temperature and higher than the temperature of the maximum ice crystal formation zone thereof, i.e., that the stored object fails to maintain the supercooled state. Since the stored object is maintained in the supercooled state for a predetermined time and released from the supercooled state at step S37, the control means 60 goes to step S31 to thaw the stored object.

At step S39, the control means 60 judges that the stored object is maintained in the supercooled state below the temperature of the maximum ice crystal formation zone thereof. Here, the control means 60 can display through the display means 40 that the stored object is maintained in the supercooled state.

At step S41, the control means 60 determines whether the temperature of the stored object enters the region (judgment region) lower than the phase transition temperature or higher than the temperature of the maximum ice crystal formation zone so as to judge whether the stored object maintained in the supercooled state is released from the supercooled state. If the temperature of the stored object enters the judgment region, the control means 60 proceeds to step S37. If not, the control means 60 proceeds to step S39.

At the aforementioned step S31, after the stored object is thawed, i.e., when any ice crystal does not exist in the stored object, the control means 60 goes back to step S21 to supercool the stored object again.

However, the scope of the present invention is not limited to the embodiments and the drawings but defined by the appended claims.

The invention claimed is:

1. A supercooling recognition method, comprising:
   a step for cooling a stored object to below a temperature of a maximum ice crystal formation zone thereof; and
   a first judgment step for judging that the stored object fails to maintain the supercooled state when the temperature of the stored object is maintained higher than the temperature of the maximum ice crystal formation zone thereof for a first reference time after the temperature of the stored object reaches a phase transition temperature thereof.

2. The supercooling recognition method of claim 1, further comprising:
   a second judgment step before the first judgment step for judging that the stored object fails to maintain the supercooled state when the temperature of the stored object is maintained around the phase transition temperature thereof for a second reference time after the temperature of the stored object reaches the phase transition temperature thereof.

3. The supercooling recognition method of claim 1, further comprising a step of visually or audibly displaying a judgment result of the judgment step, when the stored object fails to maintain the supercooled state in the first judgment step.

4. The supercooling recognition method of claim 2, wherein the first or second reference time is set up according to one or more of a kind, volume and mass of the stored object.

5. The supercooling recognition method of claim 1, further comprising a step of thawing the stored object when the stored object fails to maintain the supercooled state in the first judgment step.

6. The supercooling recognition method of claim 4, further comprising a step of checking one or more of the kind, volume and mass of the stored object.

7. The supercooling recognition method of claim 1, further comprising a step of checking one or more of the kind, volume and mass of the stored object.

8. The supercooling recognition method of claim 2, further comprising a step of checking one or more of the kind, volume and mass of the stored object.

9. The supercooling recognition method of claim 2, further comprising a step of visually or audibly displaying a judgment result of the judgment step when the stored object fails to maintain the supercooled state in the second judgment step.

10. The supercooling recognition method of claim 2, wherein the first or second reference time is set up according to one or more of a kind, volume and mass of the stored object.

11. The supercooling recognition method of claim 2, comprising a step of thawing the stored object when the stored object fails to maintain the supercooled state in the second judgment step.

12. A supercooling apparatus, comprising:
    a cooling means for cooling a stored object to below a temperature of a maximum ice crystal formation zone thereof;
    a sensing means for sensing a temperature of the stored object; and
    a control means for acquiring the temperature of the stored object from the sensing means, controlling the cooling means to cool the stored object, and judging whether the stored object is maintained in a supercooled state on the basis of the temperature thereof,
    wherein the control means judges that the stored object fails to maintain the supercooled state when the temperature of the stored object is maintained around the phase transition temperature thereof for a second reference time after the temperature of the stored object reaches the phase transition temperature thereof.

13. The supercooling apparatus of claim 12, further comprising a thawing means for releasing the stored object from freezing when the stored object fails to maintain the supercooled state.

14. The supercooling apparatus of claim 12, further comprising a sensing means for checking one or more of the kind, volume and mass of the stored object.

15. The supercooling apparatus of claim 12, wherein the control means judges that the stored object fails to maintain the supercooled state when the temperature of the stored object is maintained higher than the temperature of the maximum ice crystal formation zone thereof for a first reference time after the temperature of the stored object reaches a phase transition temperature thereof.

16. The supercooling apparatus of claim 15, further comprising a sensing means for checking one or more of the kind, volume and mass of the stored object.

17. The supercooling apparatus of claim 15, further comprising a thawing means for releasing the stored object from freezing, when the stored object fails to maintain the supercooled state.

* * * * *